(12) United States Patent
Mori (10) Patent No.: US 10,843,556 B2
(45) Date of Patent: Nov. 24, 2020

(54) RESIN-MADE FUEL TANK MOUNTING STRUCTURE AND CONSTRUCTION MACHINE

(71) Applicant: Caterpillar SARL, Geneva (CH)

(72) Inventor: Kenichi Mori, Akashi (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 16/310,031

(22) PCT Filed: Jun. 23, 2017

(86) PCT No.: PCT/EP2017/065608
§ 371 (c)(1),
(2) Date: Dec. 14, 2018

(87) PCT Pub. No.: WO2018/001913
PCT Pub. Date: Jan. 4, 2018

(65) Prior Publication Data
US 2019/0193557 A1 Jun. 27, 2019

(30) Foreign Application Priority Data
Jun. 27, 2016 (JP) .................. 2016-126793

(51) Int. Cl.
*B60K 15/03* (2006.01)
*B60K 15/067* (2006.01)
(Continued)

(52) U.S. Cl.
CPC ...... *B60K 15/067* (2013.01); *B60K 15/03177* (2013.01); *B60K 15/073* (2013.01);
(Continued)

(58) Field of Classification Search
CPC ............... B60K 15/067; B60K 15/03; B60K 15/03177; B60K 15/073;
(Continued)

(56) References Cited

U.S. PATENT DOCUMENTS 4,836,568 A * 6/1989 Preslik ............... B60R 3/00
224/401
5,593,167 A * 1/1997 Barnhardt ........... B60R 3/00
180/68.5
(Continued)

FOREIGN PATENT DOCUMENTS

EP 1162318 A1 12/2001
EP 2058161 A1 5/2009
(Continued)

OTHER PUBLICATIONS

International Search Report for related International Application No. PCT/EP2017/065608; report dated Sep. 5, 2017.

*Primary Examiner* — Tan Le (57) ABSTRACT

A resin-made fuel tank mounting structure for construction machine is provided that provides a tank capacity without significantly affecting the layouts of other components and easily achieves assembling quality required for the resin-made fuel tank. A resin-made fuel tank mounting structure for mounting resin-made fuel tank on a construction machine including stepwise maintenance steps having plurality of treads and connecting a body floor on body frame and maintenance floor arranged above the body floor, wherein stepwise portion constituting a part of a plurality of treads of maintenance steps is formed on resin-made fuel tank, and horizontal surface of first bracket for fixing resin-made fuel tank onto the body floor is used as the lowest tread on the body floor of the plurality of treads.

7 Claims, 5 Drawing Sheets

(51) Int. Cl.
*B60K 15/073* (2006.01)
*E02F 9/08* (2006.01)
*B60R 3/00* (2006.01)

(52) U.S. Cl.
CPC .............. *B60R 3/00* (2013.01); *E02F 9/0883* (2013.01); *B60K 2015/03493* (2013.01); *B60Y 2200/41* (2013.01); *B60Y 2200/412* (2013.01); *B60Y 2304/07* (2013.01)

(58) Field of Classification Search
CPC ... B60K 2015/03493; B60R 3/00; B60R 3/02; E02F 9/0883; E02F 9/08; B62D 15/20; B60Y 2200/412; B60Y 2200/41; B60Y 2304/07
See application file for complete search history.

(56) References Cited

U.S. PATENT DOCUMENTS

| | | | |
|---|---|---|---|
| 6,053,533 A | | 4/2000 | Osborn |
| 6,347,678 B1* | | 2/2002 | Osborn ............... B60K 15/067 |
| | | | 180/68.5 |
| 7,637,563 B2* | | 12/2009 | Plett ..................... B60R 3/02 |
| | | | 280/166 |
| 9,434,333 B2* | | 9/2016 | Sloan ..................... B60R 19/24 |
| 2008/0169623 A1 | | 7/2008 | Donnellan et al. |
| 2013/0236280 A1 | | 9/2013 | Yui |

FOREIGN PATENT DOCUMENTS

| | | |
|---|---|---|
| JP | H05-85418 A | 4/1993 |
| JP | 2005232799 A | 9/2005 |
| JP | 2006-056292 A | 3/2006 |
| JP | 2006341702 A | 12/2006 |
| JP | 2008095326 A | 4/2008 |

* cited by examiner

RESIN-MADE FUEL TANK MOUNTING STRUCTURE AND CONSTRUCTION MACHINE

CROSS-REFERENCE TO RELATED APPLICATION

This Application is a 35 USC § 371 US National Stage filing of International Application No. PCT/EP2017065608 filed on Jun. 23, 2017 which claims priority under the Paris Convention to Japanese Patent Application No. 2016-126793 filed on Jun. 27, 2016.

FIELD OF THE DISCLOSURE

The present invention relates to a resin-made fuel tank mounting structure and a construction machine including the structure.

BACKGROUND OF THE DISCLOSURE

To mount a resin-made fuel tank on a construction machine such as a hydraulic excavator, a strap such as a band is often used to fix the tank to a body frame of the machine (see Patent Document 1). Winding a strap on the outer periphery of a resin-made fuel tank, however, makes the tank look bad. To prevent the strap-wound tank from being directly seen, the tank is generally shielded with a cover or in other ways.

When mounting a fuel tank on a construction machine, the tank naturally has to be smaller than the capacity of the cover so as to fit inside the cover. Planar space for installing a fuel tank is restricted by other components of the construction machine, and height space is also restricted to ensure visibility. Hence It is hard to ensure a sufficient tank capacity.

Covering the tank requires the cover to be detachable, which also restricts whereto install the tank. Further, trying to install a tank while ensuring a sufficient tank capacity and detachability of a cover will affect the layout of other components, which will in turn require a significant design modification.

Further, an assembling structure that fixes the same to its body frame with a strap such as a band presents a problem that accurate strap-fastening management is required and thus it is hard to achieve required assembling quality.

Patent Documents 2 and 3 disclose techniques related to a resin-made fuel tank. These techniques will be described below with the numerals used in each of the Documents being added with parentheses.

Patent Document 2 discloses a configuration that fixes a resin-made fuel tank to a construction machine without a strap. Specifically, the document discloses a configuration that allows a resin-made fuel tank to be placed on a main base portion (61) and to be fixed with a metal bracket such as a vertical pillar portion (62) or a subordinate base portion (63).

Patent Document 3 discloses a configuration related not to a construction machine but to a mobile vehicle such as a combine harvester. In this configuration, resin-made fuel tank (21) is placed in a lower area present ahead of a driver's seat, an uneven pattern is blow-molded on an upper wall portion (21a) of a fuel tank (21) to form a step floor (SF), a recess is formed on a side wall portion of fuel tank (21) to serve as an auxiliary step (S1S).

Patent Document 1: Japanese Unexamined Patent Application Publication No. 2013-91929
Patent Document 2: Japanese Unexamined Patent Application Publication No. 2014-159719
Patent Document 3: Japanese Unexamined Patent Application Publication No. 2006-56392

SUMMARY OF INVENTION

The technique disclosed in Patent Document 2 fixes a resin-made fuel tank with a metal bracket instead of a strap. This does not require fastening management that is as accurate as with a strap, making it easier to achieve required assembling quality.

For the technique disclosed in Patent Document 2, however, a bracket is wound on an outer periphery of a resin-made fuel tank, as with the case of using a strap. It is thus presumed to cover the exterior of the tank for better appearance.

It is therefore hard to ensure a sufficient tank capacity, and a place where to install the tank is limited. Further, trying to install the tank while ensuring a sufficient tank capacity and detachability of the cover will require a significant design modification.

The technique disclosed in Patent Document 3, on the other hand, enables efficient use of space because it uses space on a lower portion of a step floor of a driver's seat to install a resin-made fuel tank, and eliminates the need for a dedicated step floor because an upper wall portion of the resin-made fuel tank forms a step floor. This may contribute to cost reduction.

For a construction machine, like a hydraulic excavator, with an upper swing body mounted on a lower travelling body, a swing device, etc., is placed on a lower portion of a step floor of a driver's seat of an upper swing body, leaving insufficient space. It is therefore hard to place a resin-made fuel tank on the lower portion of the floor. For a tractor excavator or a wheel loader, the floor of the driver's seat often serves as an element for ensuring the strength of the body structure. It is thus hard to place a resin-made fuel tank on the floor of the driver's seat.

Considering the above discussion, it is hard to apply the technique disclosed in Patent Document 3 to install a resin-made fuel tank on a lower portion of a step floor of a driver's seat, or to form a step floor with an upper wall portion of a resin-made fuel tank, as far as a construction machine is concerned.

The present invention is conceived in view of the above problems, and aims to provide a resin-made fuel tank mounting structure and a construction machine that provide a tank capacity without significantly affecting the layout of other components and easily achieve assembling quality required for a resin-made fuel tank.

SUMMARY OF THE DISCLOSURE (1) To achieve the above objective, a resin-made fuel tank mounting structure of the present invention mounts a resin-made fuel tank on a construction machine that connects a body floor formed on a body frame (a swing frame of a hydraulic excavator) and a maintenance floor disposed above the body floor, and includes a stepwise maintenance steps having a plurality of treads, being characterized in that a stepwise portion constituting a part of the plurality of treads of the maintenance steps is formed on the resin-made fuel tank, and a horizontal surface of a first bracket fixing the resin-made fuel tank onto the body floor is used on the lowest tread on the body floor of the plurality of treads.

(2) A side wall portion erected on both sides of the plurality of treads of the maintenance steps is preferably formed on the resin-made fuel tank.

(3) Preferably, an uneven surface aligned with an uneven shape on the body side is formed on a bottom wall portion of the resin-made fuel tank, an upright wall surface portion that reaches the bottom wall portion is formed on an end of the uppermost tread of the stepwise portion of the resin-made fuel tank, and the resin-made fuel tank engages the uneven surface with the corresponding uneven shape, and is fixedly clamped by an opposing surface on the body side against which the upright wall surface portion abuts and a vertical surface portion of the first bracket.

(4) One of the both side wall portions of the resin-made fuel tank is preferably fixed by a second bracket.

(5) A reinforcing rib is preferably formed at a location where the treads of the stepwise portion are formed.

(6) A anti-slip plate is preferably attached to each tread of the stepwise portion.

(7) Preferably, anti-slip treatment is applied or an anti-slip plate is attached onto a horizontal surface of the first bracket forming the lowest tread on the body floor.

(8) A construction machine of the present invention preferably comprises the resin-made fuel tank mounting structure according any one of the above (1) to (7).

The present invention makes it possible to provide a tank capacity without significantly affecting the layout of other components because space for installing a maintenance steps is used to mount a resin-made fuel tank. It is also possible to easily achieve required assembling quality because a resin-made fuel tank is fixed with a bracket instead of a strap. Furthermore, cost for installing a maintenance steps can be lowered because a horizontal surface of the bracket is used as the lowest tread on the body floor of the maintenance steps.

DETAILED DESCRIPTION OF THE DISCLOSURE

Embodiments of the present invention will now be described with reference to the accompanying drawings.

The following embodiments are merely illustrative and not intended to exclude various modifications or applications of techniques that are not shown in the embodiments. Each configuration of the following embodiments can be implemented in variations without departing from the scope of the same, as well as be selected as necessary or combined as appropriate.

In the following description, "above" or "upward" refers to "vertically upward", and "below" or "downward" refers to "vertically downward" based on a state in which the body of a construction machine is positioned on a horizontal surface, while "inward" or "inside" refers to "directed at the center line at the widthwise center of the body on a lateral surface of the body, and "outward" or "outside" refers to "directed away from the center line".

In addition, a location referred to as " . . . surface portion" such as "internal surface portion", "external surface portion", "upper surface portion", and "front surface portion" refers to a plate-like portion (wall portion) with a thickness including the relevant surface. A location referred to as "rising portion" also refers to a plate-like portion (wall portion) with a thickness.

[Configuration]

The present embodiment illustrates a hydraulic excavator as an example of a construction machine.

Figure 1:
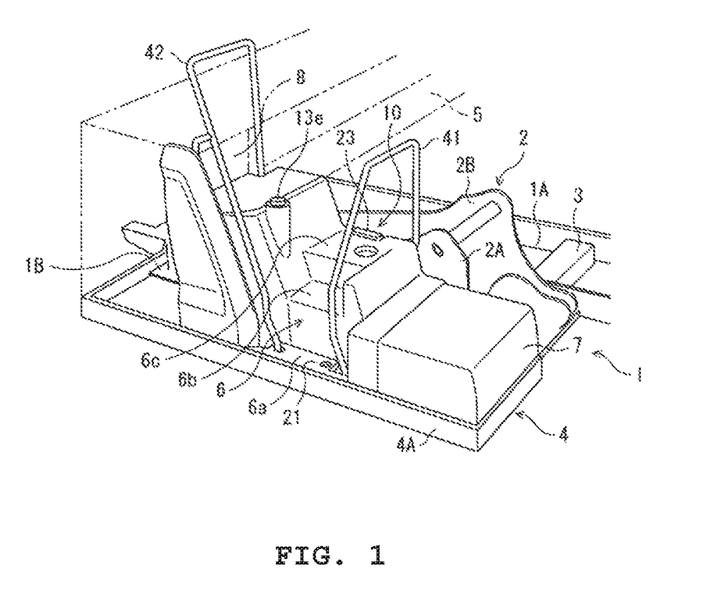
FIG. 1 is a schematic perspective view illustrating a resin-made fuel tank mounting structure together with a body frame of a construction machine, according to an embodiment of the present invention.

As shown in FIG. 1, body frame 1 of a hydraulic excavator according to the present embodiment is a frame of an upper swing body provided swingably on a crawler-type lower travelling body, which is not shown in the drawing (hereinafter referred to as "swing frame"). Center frame 2 is provided with swing frame 1 in a widthwise center. Center frame 2 is formed of a pair of vertical plates 2A, 2B extending in a longitudinal and vertical direction of a body. A work machine is attached to a front portion of center frame 2 (a boom with a bucket being attached via an arm to an end thereof in this context, though not shown).

Side frame 4A forming skirt portion 4 is fixed to each of vertical plates 2A, 2B of center frame 2 via plurality of beams 3 extending outward widthwise. A portion on beam 3 and skirt 4 on either of the left or right side (left side in this context) of the front portion of center frame 2 is cab mounting portion 1A on which a cab (not shown) is mounted, while a portion on a rear portion of center frame 2 is engine mounting portion 1B on which an engine (not shown) is mounted. A counterweight (not shown) is attached to an end of center frame 2.

Maintenance floor 5 (shown in a chain double-dashed line) is provided above engine mounting portion 1B, supported by center frame 2. On a lateral side of a body present ahead of maintenance floor 5 (a lateral side of body frame 1, the right side in this context), maintenance steps 6 is provided for accessing, from a lateral outside of the body, maintenance floor 5, which is located on an upper and rear portion of the body.

Maintenance step 6 has first step 6a, and second step 6b and third step 6c wherein first step 6a is provided right above body floor 1F on skirt 4 (see FIG. 2), and second step 6b and third step 6c are provided stepwise up and toward the inside of the body from first step 6a. First step 6a forms a lowest tread (first tread), second step 6b forms a second tread, which is one step above first step 6a, and third step 6c forms a third tread, which is further one step above first step 6a. When you go up to third step 6c toward the inside of the body, you turn toward the inside of the body before going up from third step 6c to maintenance floor 5.

In the present resin-made fuel tank 10 mounting structure, stepwise portion 11 forming second step 6b and third step 6c of the above steps 6a-6c is formed on resin-made fuel tank 10, which is mounted to reserve fuel for an engine. In the present embodiment, side wall portions 12, 13 are formed on resin-made fuel tank 10 and erected on both sides of second step 6b and third step 6c (second and third treads).

In other words, resin-made fuel tank 10 is disposed in front of engine mounting portion 1B on swing frame 1, and has stepwise portion 11 with second step 6b and third step 6c being formed, wherein side wall portion 12 is formed on a right side (i.e., on a front side of the body) and side wall portion 13 is formed on a left side (i.e., on a rear side of the body) with reference to a direction of going up stepwise portion 11 (going toward the inside of the body), as shown in FIG. 2 to FIG. 5.

Figure 4:
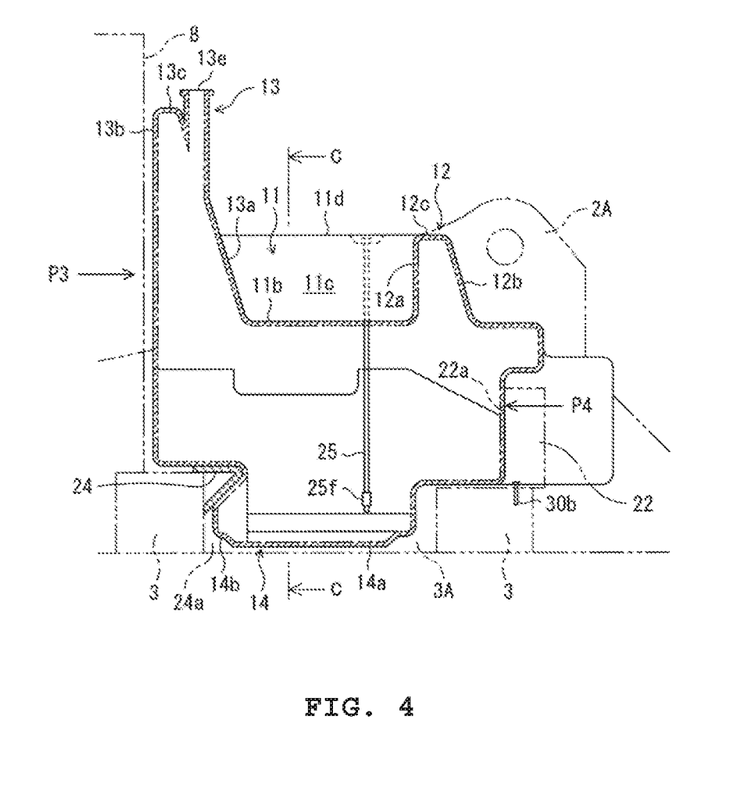
FIG. 4 is a sectional view (a B-B arrow sectional view in FIGS. 2 and 5) illustrating a resin-made fuel tank mounting structure with a focus on its mounting bracket, according to an embodiment of the present invention.

More specifically, as shown in FIG. 4, resin-made fuel tank 10 has bottom wall portion 14 having convex wall portion (uneven surface) 14a engaged with concave portion (uneven shape) 3A present between two beams 3, 3 of swing frame 1. On one of beams 3, 3 forming concave portion (uneven shape) 3A (beam 3 on a rear side of the body in this context), fourth bracket 24 having a V-shaped protruding section is welded toward an inside of concave portion 3A, while, on an opposing surface of convex wall portion 14a (the surface facing a rear of the body), backward convex portion 14b, which is fitted in recess 24a formed below fourth bracket 24, is formed. An upward inclined surface of convex portion 14b abuts against a downward inclined surface of fourth bracket 24, thereby preventing convex wall portion 14a from coming off from concave portion 3A.

Stepwise portion 11 rising from a front side of such bottom wall portion 14 (an outside of a lateral surface of the body) and bending stepwise is formed.

Stepwise portion 11 has first rising portion 11a, first horizontal surface portion 11b, second rising portion 11c, and second horizontal surface portion 11d, wherein first rising portion 11a rises substantially vertically from bottom wall portion 14, first horizontal surface portion 11b bends from first rising portion 11a into the body and extends horizontally to form second step 6b, second rising portion 11c rises substantially vertically from first horizontal surface portion 11b, second horizontal surface portion 11d bends from second rising portion 11c into the body and extends horizontally to form third step 6c. Reinforcing rib 11e for adding surface rigidity of a third tread of third step 6c is formed on second horizontal surface portion 11d (see FIG. 5).

Side wall portion 12 on a right side of stepwise portion 11 (i.e., a front side of the body) has internal surface portion 12a, external surface portion 12b, upper surface portion 12c, and front portion 12d, wherein internal surface portion 12a faces an inside of stepwise portion 11 (i.e., a rear side of the body), external surface portion 12b faces an outside of stepwise portion 11 (i.e., a front side of the body), upper surface portion 12c connects a top portion of internal surface portion 12a and a top portion of external surface portion 12b, and front portion 12d faces a front side of stepwise portion 11 (i.e., a right outside of the body).

However, internal surface portion 12a and upper surface portion 12c are formed only on the right side of first horizontal surface portion 11b (i.e., the front side of the body). External surface portion 12b forms an upper surface and a widthwise lateral surface, etc., so as to be continuous with cover 7 (see FIG. 1) for mutually adjoined components collectively arranged on a front of the body of resin-made fuel tank 10. These surfaces form volume portion 12e bulging within an extent of uninterfering with the components, increasing the capacity of resin-made fuel tank 10.

Side wall portion 13 on the left side of stepwise portion 11 (i.e., the rear side of the body) has internal surface portion 13a facing the inside of stepwise portion 11 (i.e., the front side of the body), external surface portion 13b facing the outside of stepwise portion 11 (i.e., the rear side of the body), upper surface portion 13c connecting a top portion of internal surface portion 13a and a top portion of external surface portion 13b, and front portion 13d facing the front side of stepwise portion 11 (i.e., a right exterior of the body). Oil filler opening 13e is provided upward in slight protrusion from upper surface portion 13c. Internal surface portion 13a right under oil filler opening 13e bulges toward stepwise portion 11.

Figure 3:
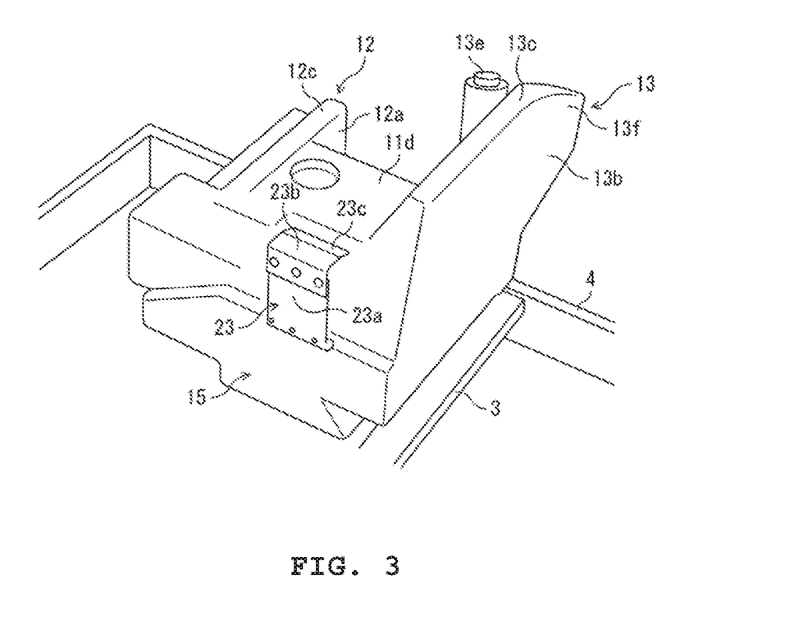
FIG. 3 is a perspective view (an A-direction arrow view of FIG. 2) illustrating a resin-made fuel tank mounting structure with a focus on its mounting bracket, according to an embodiment of the present invention.
Figure 5:
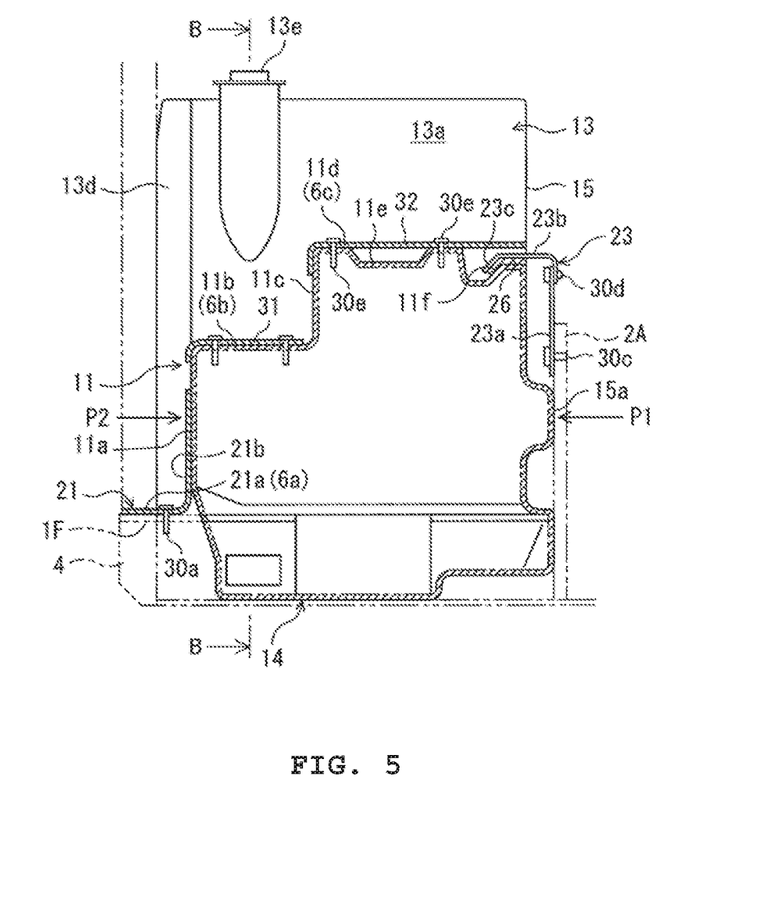
FIG. 5 is a sectional view (a C-C arrow sectional view in FIG. 4) illustrating a resin-made fuel tank mounting structure with a focus on its mounting bracket, according to an embodiment of the present invention.

Upright wall surface portion 15 connecting second horizontal surface portion 11d and bottom wall portion 14 is formed on an end of second horizontal surface portion 11d of stepwise portion 11 (on a central side of the body) (see FIGS. 3 and 5). Protruding portion 15a is formed on upright wall surface portion 15 protruding toward the center of the body and abuts against an opposing surface of vertical plate 2A of center frame 2. Protruding portion 15a adds surface rigidity of upright wall surface portion 15.

As thus configured, resin-made fuel tank 10 is arranged by fitting convex wall portion 14a of bottom wall portion 14 into concave portion 3A, which is located between two beams 3, 3 of swing frame 1, fitting convex portion 14b of convex wall portion 14a into fourth bracket 24, which is welded on to rear beam 3, and abutting a lower surface of bottom wall portion 14 against upper surfaces of beams 3, 3, as shown in FIGS. 4 and 5. In this state, protruding portion 15a of upright wall surface portion 15 abuts against the opposing surface of vertical plate 2A of center frame 2 (see FIG. 5).

Resin-made fuel tank 10, which is thus arranged on swing frame 1, is fixed to swing frame 1 by first to fourth metal brackets 21-24.

As shown in FIG. 5, first bracket 21 has horizontal surface portion 21a and vertical surface portion 21b wherein horizontal surface portion 21a has an L-shaped angle cross-section and is horizontally installed, and vertical surface portion 21b is bent at a right angle to horizontal surface portion 21a and vertically installed. Horizontal surface portion 21a is arranged at the relevant location as first step 6a that forms the lowest tread (the first tread) of maintenance steps 6, and is fixed to body floor 1F on skirt 4 with bolt 30a. This abuts vertical surface portion 21b against first rising portion 11a of stepwise portion 11 of resin-made fuel tank 10.

As a result, as shown in FIG. 5, abutment of protruding portion 15a of upright wall surface portion 15 against an opposing surface of vertical plate 2A, as shown by arrow P1, restricts the movement of resin-made fuel tank 10 toward the center of the body at a location closer to the center of the body in a widthwise direction of the body, while abutment of first rising portion 11a of stepwise portion 11 against vertical surface portion 21b of first bracket 21 restricts the movement of resin-made fuel tank 10 toward the outside of the body at a location closer to the outside of the body, as shown by arrow P2. In other words, resin-made fuel tank 10 is fixedly clamped by the opposing surface of vertical plate 2A and vertical surface portion 21b of first bracket 21.

Figure 2:
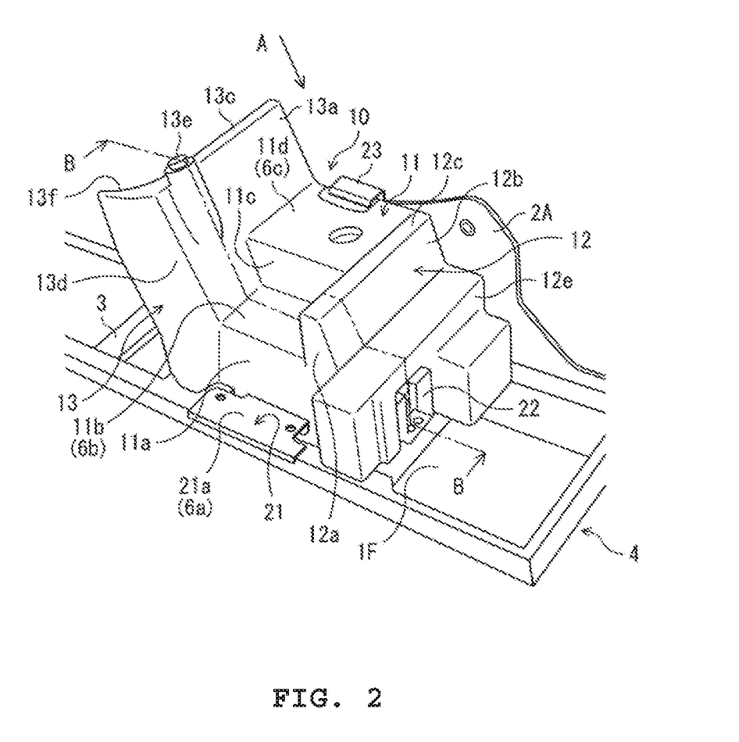
FIG. 2 is a perspective view illustrating a resin-made fuel tank mounting structure with a focus on its mounting bracket, according to an embodiment of the present invention.

As shown in FIGS. 2 and 4, second bracket 22 includes abutted portion 22a that abuts against an outer wall surface of volume portion 12e of external surface portion 12b of side wall portion 12, and is fixed to beam 3 with bolt 30b.

As a result, as shown in FIG. 4, at a location closer longitudinally to the rear of the body, abutment of an upward inclined surface of convex portion 14b of bottom wall portion 14 of resin-made fuel tank 10 against a downward inclined surface of fourth bracket 24 welded onto beam 3 of swing frame 1, as shown by arrow P3, the movement of resin-made fuel tank 10 toward the rear of the body, while abutment of outer wall surface of volume portion 12e of side wall portion 12 against abutted portion 22a of second bracket 22, as shown by arrow P4, restricts the movement of resin-made fuel tank 10 toward the front of the body. In other words, resin-made fuel tank 10 is fixedly clamped by fourth bracket 24 welded onto beam 3 on the body side and abutted portion 22a of second bracket 22.

As shown in FIGS. 3 and 5, third bracket 23 has vertical surface portion 23a, horizontal surface portion 23b, and inclined surface portion 23c, wherein vertical surface portion 23a is fixed to vertical plate 2A with bolt 30c, horizontal surface portion 23b is fixed to vertical surface portion 23a with bolt 30d, bends vertically from the fixed portion, and extends in a direction of stepwise portion 11, and inclined surface portion 23c is formed on an end of horizontal surface portion 23b, and has an inclined surface that abuts diagonally from above against inclined surface 11f of a concave portion recessed on second horizontal surface portion 11d of stepwise portion 11.

Cushioning material 26 is interposed between horizontal surface portion 23b and inclined surface portion 23c of third bracket 23 and stepwise portion 11.

Third bracket 23 restricts upward and horizontal (toward the outside of the body) movement of resin-made fuel tank 10.

Resin-made fuel tank 10 is fixed by first to third brackets 21-23 to the abutted surface of the body (the opposing surface of vertical plate 2A) laterally, longitudinally, and vertically to the body.

As shown in FIG. 1, handrails 41, 42 are installed on the left and right sides of maintenance steps 6.

As shown in FIG. 4, resin-made fuel tank 10 is provided with fuel sensor 25 for detecting a fuel level by vertical movement of float 25f.

Punching metal plates 31, 32 are fixed with bolt 30e to first horizontal surface portion 11b (second step 6b) of stepwise portion 11 of resin-made fuel tank 10 and the upper surfaces (second tread, third tread) of second horizontal surface portion 11d (third step 6c) as anti-slip plates.

Anti-slip treatment is applied to an upward horizontal surface of horizontal surface portion 21a of first bracket 21, which serves as first step 6a that forms the lowest tread (first tread) of maintenance steps 6.

[Operations and Effects]

Configured as described above, a resin-made fuel tank mounting structure according to an embodiment of the present invention can achieve the following operations and effects.

Space for installing maintenance steps 6 can be used to efficiently mount a resin-made fuel tank because resin-made fuel tank 10 forms maintenance steps 6. This in turn makes it possible to provide a tank capacity without significantly affecting the layout of other components.

It is also possible to easily achieve required assembling quality because resin-made fuel tank 10 is fixed to the body (body frame 1) with brackets 21-23 instead of a strap.

More specifically, resin-made fuel tank 10 abuts the lower surface of bottom wall portion 14 against the upper surface of beams 3, 3, protruding portion 15a of upright wall surface portion 15 against the opposing surface of vertical plate 2A, and convex portion 14b at a rear of convex wall portion 14a of bottom wall portion 14 against fourth bracket 24 welded onto beam 3 on the body side, respectively, and the opposite side of each abutted portion is restricted by first to third brackets 21-23. Resin-made fuel tank 10 is thus fixed laterally, longitudinally, and vertically to the body. Fixing resin-made fuel tank 10 with metal brackets 21-23 instead of a strap does not require fastening management that is as accurate as with a strap, which makes it easier to achieve required assembling quality.

Furthermore, cost for installing a maintenance steps 6 can be lowered because horizontal surface 21a of first bracket 21 serves as the lowest tread on the body floor 1F of the maintenance steps 6.

Reinforcing rib 11e of second horizontal surface portion 11d provides additional rigidity and strength to the treads. The upper surfaces (the second and third treads) of first horizontal surface portion 11b and second horizontal surface portion 11d have punching metal plates 31, 32 as anti-slip plates. Anti-slip treatment is applied to the horizontal surface (the first tread) of horizontal surface portion 21a of first bracket 21 serving as the lowest first step 6a of maintenance steps 6, sufficiently ensuring that the surface serves as maintenance steps 6.

[Others]

Embodiments according to the present invention have been described, but the above embodiments can be changed as appropriate to implement the invention.

In the above embodiments, for example, maintenance steps 6 are configured to go up from a side toward the center of the body in at an intermediate portion in the longitudinal direction of the body, and then further go up toward the rear of the body. Arrangements or configurations of maintenance steps 6, however, are not limited to this and may be configured, for example, to go up on one side of the body from a front portion toward the rear of the body.

An auxiliary step may be also provided below first step 6a, i.e., below body floor 1F.

These variations can be applied to a construction machine other than hydraulic excavators as well.

REFERENCE NUMERALS

1: Body frame (swing frame)
1A: Cab mounting portion
1B: Engine mounting portion
1F: Body floor
2: Center frame
2A, 2B: Vertical plate of center frame 2
3: Beam
3A: Concave portion (uneven shape) between beams 3, 3
4: Skirt portion
4A: Side frame
5: Maintenance floor
6: Maintenance steps
6a: First step
6b: Second step
6c: Third step
7: Cover
10: Resin-made fuel tank
11: Stepwise portion
11a: First rising portion
11b: First horizontal surface portion forming second step 6b
11c: Second rising portion
11d: Second horizontal surface portion forming third step 6c
11e: Reinforcing rib
11f: Inclined surface
12, 13: Side wall portion
12a, 13a: internal surface portion
12b, 13b: External surface portion 12c, 13c: Upper surface portion
12d, 13d: Front portion
12e: Volume portion
13e: Oil filler opening
14: Bottom wall portion
14a: Convex wall portion (uneven surface) of bottom wall portion 14
14b: Convex portion of convex wall portion 14a
15: Upright wall surface portion
15a: Protruding portion
21: First bracket
21a: Horizontal surface portion serving as first step 6a
21b: Vertical surface portion
22: Second bracket
22a: Abutted portion
23: Third bracket
23a: Vertical surface portion
23b: Horizontal surface portion
23c: Inclined surface portion
24: Fourth bracket
24a: Recess
25: Fuel sensor
31, 32: Punching metal plates
41, 42: Handrails

The invention claimed is:

1. A resin-made fuel tank mounting structure for mounting a resin-made fuel tank on a construction machine comprising stepwise maintenance steps:
having plurality of treads; and
connecting a body floor formed on a body frame and a maintenance floor disposed above the body floor, wherein:
a stepwise portion constituting a part of the plurality of treads of the maintenance steps is formed on the resin-made fuel tank;
an upright wall surface portion reaching the bottom wall portion is formed on an end of an uppermost tread of the stepwise portion of the resin-made fuel tank;
a horizontal surface of a first bracket for fixing the resin-made fuel tank to the body floor is used as a lowest tread on the body floor of the plurality of treads; and
an uneven surface aligned with an uneven shape on the body side is formed on a bottom wall portion of the resin-made fuel tank, the resin-made fuel tank engaging the uneven surface with the corresponding uneven shape, and is fixedly clamped by an opposing surface on the body side against which the upright wall surface portion abuts and a vertical surface portion of the first bracket.

2. The resin-made fuel tank mounting structure according to claim 1, wherein a side wall portion erected on both sides of the plurality of treads of the maintenance steps is formed on the resin-made fuel tank.

3. The resin-made fuel tank mounting structure according to claim 2, wherein the side wall on one side of the plurality of treads of the resin-made fuel tank is fixed by a second bracket.

4. The resin-made fuel tank mounting structure according to any one of claim 1, wherein a reinforcing rib is formed at a location where the tread of the stepwise portion is formed.

5. The resin-made fuel tank mounting structure according to any one of claim 1, wherein an anti-slip plate is attached to each tread of the stepwise portion.

6. The resin-made fuel tank mounting structure according to any one of claim 1, wherein anti-slip treatment is applied or an anti-slip plate is attached onto a horizontal surface portion of the first bracket forming a lowest tread on the body floor.

7. A construction machine comprising the resin-made fuel tank mounting structure according to any one of claim 1.

* * * * *